United States Patent
Chico (10) Patent No.: US 11,873,080 B2
(45) Date of Patent: Jan. 16, 2024

(54) AIRCRAFT WHEEL AND BRAKE ASSEMBLY

(71) Applicant: SAFRAN LANDING SYSTEMS, Velizy Villacoublay (FR)

(72) Inventor: Philippe Chico, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 461 days.

(21) Appl. No.: 16/936,681

(22) Filed: Jul. 23, 2020

(65) Prior Publication Data

US 2021/0024201 A1 Jan. 28, 2021

(30) Foreign Application Priority Data

Jul. 24, 2019 (FR) ...................................... 1908422

(51) Int. Cl.
| | |
|---|---|
| *B64C 25/42* | (2006.01) |
| *B60T 8/17* | (2006.01) |
| *B60T 17/22* | (2006.01) |
| *B64C 25/34* | (2006.01) |
| *B64D 45/00* | (2006.01) |

(52) U.S. Cl.
CPC .......... *B64C 25/426* (2013.01); *B60T 8/1703* (2013.01); *B60T 17/22* (2013.01); *B64C 25/34* (2013.01); *B64D 2045/0085* (2013.01)

(58) Field of Classification Search
CPC ..... B64C 25/34; B64C 25/426; B60T 8/1703; B60T 17/22; B64D 2045/0085
See application file for complete search history.

(56) References Cited

U.S. PATENT DOCUMENTS

| | | | |
|---|---|---|---|
| 9,428,162 B1 | 8/2016 | Poisson et al. | |
| 10,451,130 B2* | 10/2019 | Solari | ................... B60T 17/221 |
| 2003/0102191 A1* | 6/2003 | DeVlieg | ................. B60T 8/172 |
| | | | 188/1.11 W |
| 2005/0251306 A1 | 11/2005 | Gowan et al. | |
| 2015/0088371 A1* | 3/2015 | Kanemori | ............... B64C 25/42 |
| | | | 701/33.9 |
| 2015/0203194 A1* | 7/2015 | Griffith | ................... B60T 8/176 |
| | | | 701/3 |

(Continued)

FOREIGN PATENT DOCUMENTS

| | | |
|---|---|---|
| CN | 106081136 A | 11/2016 |
| EP | 1886887 A1 | 2/2008 |
| EP | 3339170 A1 | 6/2018 |

OTHER PUBLICATIONS

French Search Report for FR 1908422 dated Mar. 16, 2020.

*Primary Examiner* — Vishal R Sahni
(74) *Attorney, Agent, or Firm* — Sughrue Mion, PLLC (57) ABSTRACT

Aircraft wheel and brake assembly, including:
- a wheel (20) and a brake (21) comprising at least one friction member (31), an actuator bracket (24), and at least one brake actuator (25) held by the actuator bracket;
- a first measuring device arranged to measure a rotation speed of the wheel (20);
- a second measuring device arranged to measure a temperature of the friction member (31);
- a data concentrator (40) arranged to acquire measurement signals produced by the first measuring device and by the second measuring device, and to process and transmit the measurement signals to the outside,
- the data concentrator (40) being mounted on the actuator bracket (24).

13 Claims, 8 Drawing Sheets

(56) References Cited

U.S. PATENT DOCUMENTS

| | | | |
|---|---|---|---|
| 2017/0082163 A1* | 3/2017 | Serra | B60T 8/885 |
| 2018/0106319 A1* | 4/2018 | Solari | F16D 65/08 |
| 2019/0077500 A1* | 3/2019 | Kipp | B60T 8/1703 |
| 2019/0126894 A1* | 5/2019 | Goyez | B64C 25/405 |
| 2020/0080609 A1* | 3/2020 | Muniraju | G01D 5/40 |
| 2021/0024201 A1* | 1/2021 | Chico | B64C 25/34 |

* cited by examiner

AIRCRAFT WHEEL AND BRAKE ASSEMBLY

FIELD OF THE INVENTION

The invention relates to the field of aircraft wheel and brake assemblies.

BACKGROUND OF THE INVENTION

An aircraft wheel braking system comprises a plurality of brakes that are each provided on a so-called "braked" wheel of the aircraft.

Each brake includes one or more friction members, for example a stack of carbon discs, and one or more brake actuators that are mounted on an actuator bracket.

In the case of a hydraulic braking system, the brake actuators are hydraulic actuators and the actuator bracket is a brake ring (also called a hydraulic ring). In the case of an electric braking system, the brake actuators are electromechanical actuators and the actuator bracket is an actuator holder.

The braking system works in conjunction with a monitoring system that, for each wheel and brake assembly, measures and monitors certain parameters of the wheel and brake assembly.

The monitoring system thus conventionally includes, for each wheel and brake assembly, a temperature measuring device that measures a temperature of the stack of carbon discs, a speed measuring device that measures the rotation speed of the wheel, and a pressure measuring device that measures the pressure prevailing in the tyre on the wheel.

Figure 1:
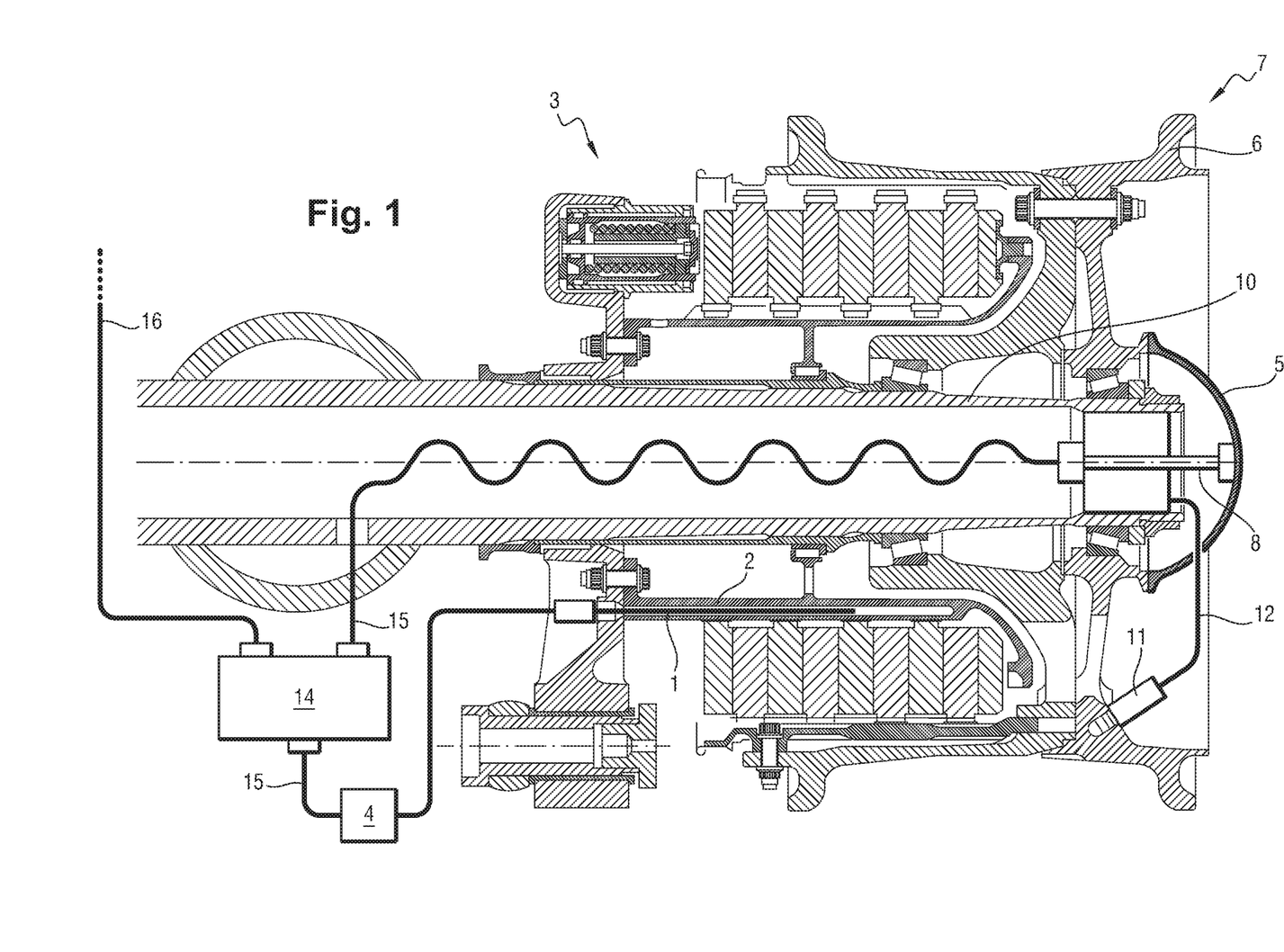
FIG. 1 shows a cross-sectional view, along a plane passing through an axis of rotation of an aircraft wheel, of an aircraft wheel and brake assembly of the prior art.

With reference to FIG. 1, the temperature measuring device of a wheel and brake assembly of the prior art conventionally comprises a type K thermocouple probe 1 positioned in a cavity of the torque tube 2 of the brake 3. The thermocouple probe 1 is connected to a compensation unit 4 that is situated at the bottom of the landing gear, or sometimes higher up on the landing gear. The junction between the copper wires and the chromel and Alumel (registered trademark) wires is made in the compensation unit 4. The cold junction temperature is measured in the compensation unit 4 in order to carry out temperature compensation.

The speed measuring device conventionally uses a wheel cap 5 fastened to the rim 6 of the wheel 7 and rotating with the wheel 7 in order to drive a target by means of drive means 8. The rotation speed of the wheel 7 is evaluated by means of a sensing component. The target and the sensing component are incorporated into the axle 10 close to one end of the axle 10.

The tyre pressure measuring device includes a rotating part rigidly connected to the wheel 7 for rotation therewith, and a fixed part. The rotating part comprises a pressure sensor 11 that is mounted on the rim 6 and includes a sensing cell pneumatically connected to the inside of the tyre on the wheel 7. The rotating part also comprises a cable 12 connected to the pressure sensor 11, and a rotating antenna. The fixed part comprises a fixed antenna and a printed circuit board. The pressure measurements are transmitted by the rotating part to the fixed part via the rotating antenna and the fixed antenna. The rotating part and the fixed part are incorporated into the wheel cap 5 and the axle 10.

A large number of electric wires is necessary to power the measuring devices of the wheel and brake assemblies of a landing gear, and to transmit the measurement signals produced to the avionics. These electric wires pass through the axle 10 that holds the wheels, run along the landing gear, and travel into the fuselage of the aircraft.

On some aircraft, each landing gear includes one or more junction boxes 14 situated at the bottom of the landing gear or on the landing gear. Each junction box 14 is connected to the measuring devices of one or more wheel and brake assemblies via electric wires 15. The junction box 14 is also connected to the rest of the aircraft by one or more wire strands 16 that run along the landing gear towards the rest of the aircraft. The junction box or boxes 14 and the strand or strands 16 make it possible to pool the carrying of power supplies and data between the aircraft and the measuring devices.

All of the equipment described above, i.e. the measuring devices and their sensors, as well as the electric wires, junction boxes and compensation units, are simultaneously large, heavy and costly.

Furthermore, each time the tyre on a wheel is changed, i.e. generally every 300 flights, the electrical equipment incorporated on the wheel 7, in the wheel cap 5 and in the axle 10, must be disconnected to access the wheel 7 and remove it from the axle 10. This electrical equipment is then reincorporated and reconnected when a new wheel 7 with a new tyre is mounted on the axle 10. These maintenance operations are relatively lengthy and complex and pose the risk of damage to the electrical equipment, electrical wires and connectors.

OBJECT OF THE INVENTION

The object of the invention is to reduce the cost and mass of a system for monitoring an aircraft wheel and brake assembly, facilitate incorporation and maintenance, and limit the risks of damage to this monitoring system.

SUMMARY OF THE INVENTION

In order to achieve this aim, an aircraft wheel and brake assembly is proposed, comprising:
 a wheel;
 a brake arranged to brake the wheel and comprising at least one friction member, an actuator bracket, and at least one brake actuator held by the actuator bracket and arranged to selectively exert a braking force on the friction member;
 a first measuring device arranged to measure a rotation speed of the wheel;
 a second measuring device arranged to measure a temperature of the friction member;
 a data concentrator arranged to acquire measurement signals produced by the first measuring device and by the second measuring device, to process the measurement signals so as to produce digital monitoring signals, and to transmit the digital monitoring signals to the outside of the aircraft wheel and brake assembly, the data concentrator comprising a housing and at least one printed circuit board incorporated into the housing, the data concentrator being mounted on the actuator bracket.

In the wheel and brake assembly according to the invention, the data concentrator is thus mounted on the actuator bracket of the brake and acquires the measurement signals produced by the first measuring device and by the second measuring device.

This configuration makes it possible to eliminate the large number of electric wires that pass inside the axle, together with the junction box or boxes. This therefore reduces the cost and mass of the monitoring system, and facilitates the incorporation thereof into the landing gear. In addition, the invention makes it possible to avoid having to drill holes in the axle to pass the electric wires through, which makes it possible to simplify the manufacturing of the landing gear and therefore reduce the cost thereof. Furthermore, it is now no longer necessary to disconnect the sensors mounted on the wheel or in the wheel cap in order to remove the wheel from the axle. The removal of the wheel no longer requires the handling of electrical connections, which facilitates maintenance operations and limits the risk of damage to this equipment.

An aircraft wheel and brake assembly as described above is additionally proposed, in which the data concentrator is positioned between two adjacent brake actuators held by the actuator bracket.

An aircraft wheel and brake assembly as described above is also proposed, in which the brake is a hydraulic brake, and in which the housing is fastened to fastening means that extend on or from rear portions of two adjacent piston housing casings.

An aircraft wheel and brake assembly as described above is further proposed, in which the data concentrator is positioned in a lower zone of the actuator bracket.

An aircraft wheel and brake assembly as described above is also proposed, in which the first measuring device includes a first target and a first sensing component, the first target having a generally circular shape, being rigidly connected to a rim of the wheel for rotation therewith, and being positioned close to a peripheral portion of the rim of the wheel, the first sensing component being held by the actuator bracket.

An aircraft wheel and brake assembly as described above is additionally proposed, in which the first sensing component is incorporated into or on the data concentrator.

An aircraft wheel and brake assembly as described above is also proposed, in which the first measuring device includes a first target and a first sensing component, the first target having a generally circular shape and being mounted on a hub of the wheel, the first sensing component being mounted on a torque tube of the brake.

An aircraft wheel and brake assembly as described above is also proposed, in which the first sensing component is mounted on a transverse annular web of the torque tube.

An aircraft wheel and brake assembly as described above is additionally proposed, in which the hub includes protrusions and itself forms the first target.

An aircraft wheel and brake assembly as described above is further proposed, in which the second measuring device comprises a thermocouple probe, and in which temperature compensation is carried out in the data concentrator.

An aircraft wheel and brake assembly as described above is also proposed, further comprising a third measuring device arranged to measure wear of the friction member.

An aircraft wheel and brake assembly as described above is additionally proposed, in which the third measuring device includes a second target and a second sensing component, the second target being connected to the friction member, the second sensing component being held by the actuator bracket.

An aircraft wheel and brake assembly as described above is also proposed, in which the second sensing component is incorporated into or on the data concentrator housing.

An aircraft wheel and brake assembly as described above is also proposed, in which the data concentrator comprises an antenna for transmitting the digital monitoring signals via wireless transmission.

An aircraft landing gear is additionally proposed, comprising an aircraft wheel and brake assembly as described above.

The invention will be more clearly understood in light of the following description of particular non-limitative embodiments of the invention.

BRIEF DESCRIPTION OF THE DRAWINGS

Reference will be made to the attached drawings, in which.

DETAILED DESCRIPTION OF THE INVENTION

Figure 2:
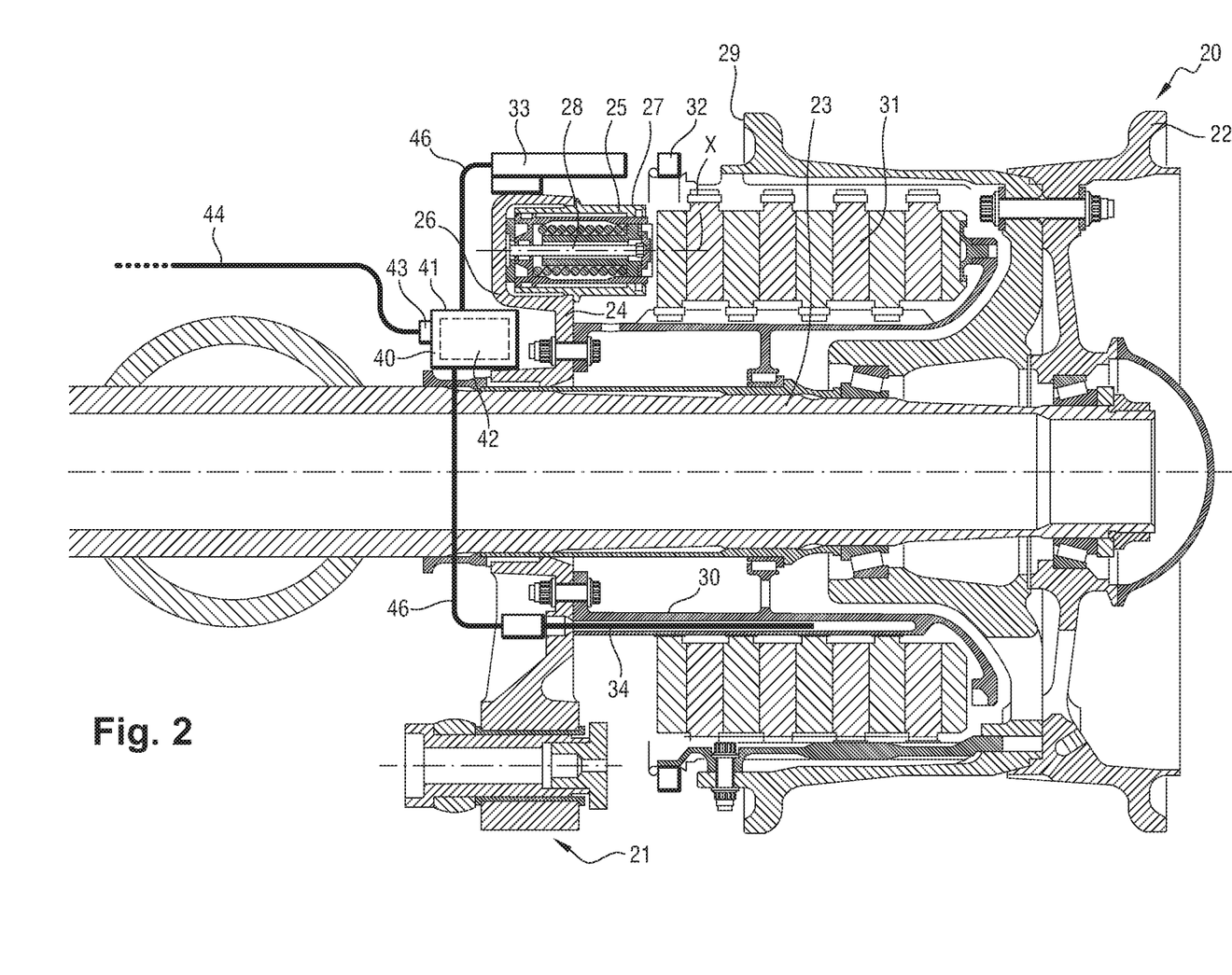
FIG. 2 shows a cross-sectional view, along a plane passing through an axis of rotation of an aircraft wheel, of an aircraft wheel and brake assembly according to a first embodiment of the invention.
Figure 3:
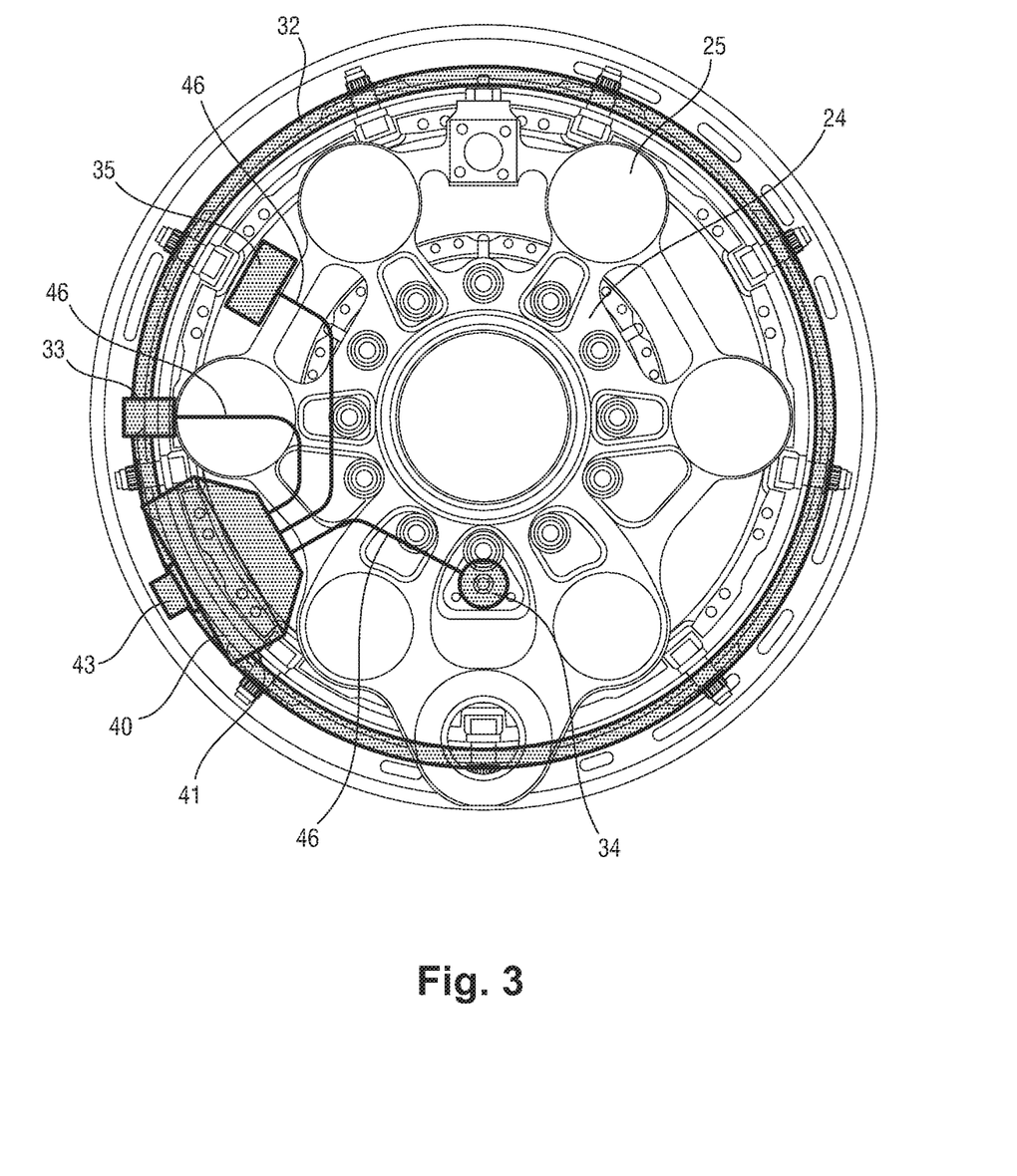
FIG. 3 shows a view of a rear face of the aircraft wheel and brake assembly according to the first embodiment of the invention.

An aircraft wheel and brake assembly according to a first embodiment of the invention when it is assembled is described below with reference to FIGS. 2 and 3.

The aircraft wheel and brake assembly firstly includes a wheel 20 of an aircraft landing gear and a brake 21 for braking the wheel 20.

The wheel 20 includes a rim 22 that receives a tyre and is mounted rotatably on an axle 23 located at the bottom of the landing gear.

Here, the brake 21 is a hydraulic brake. The brake 21 comprises an actuator bracket, in this case a brake ring 24, that holds at least one brake actuator, in this case a plurality of brake actuators 25. The brake ring 24 is mounted on the axle 23.

The brake ring 24 comprises a plurality of casings 26 with a generally cylindrical outer shape. Each casing 26 defines a cavity that opens onto the side of the wheel 20 and forms a piston housing.

Each brake actuator 25 comprises a cylindrical sleeve 27 in which a piston 28 is mounted, arranged to slide along an axis X. The sleeve 27 is sealingly accommodated in the piston housing.

A torque tube 30 is fastened to the brake ring 24. The torque tube 30 extends in the rim 22. The brake ring 24, and therefore the torque tube 30, are prevented from rotating relative to the axle 23 by stopping means not shown here.

The brake 21 also comprises at least one friction member, in this case a stack of carbon discs 31 made up of rotors that are rigidly connected to the rim 22 for rotation therewith and stators that are rigidly connected to the torque tube 30 for rotation therewith.

The brake actuators 25 are arranged to selectively exert a braking force on the carbon discs 31 on the admission of pressurized fluid.

The aircraft wheel and brake assembly also includes a first measuring device arranged to measure a rotation speed of the wheel 20.

The first measuring device includes a first target 32 and a first sensing component 33.

The first target 32 has a generally circular shape and is a metal toothed wheel here. The first target 32 comprises alternating teeth (or bars) and recesses. The teeth are either radial teeth, i.e., they extend on a periphery of the first target 32 in radial directions, or axial teeth, i.e. they extend on a periphery of the first target 32 in axial directions.

The first target 32 is rigidly connected to the rim of the wheel 20 for rotation therewith. The first target 32 is positioned close to a peripheral portion of the rim 22 which is near the rim flange 29, on the side of the brake 21. The first target 32 is mounted either directly on the rim 22, or via any intermediate part in turn fastened directly to the rim 22, for example a heat shield or a dedicated part for fastening the first target 32.

Here, the sensing component 33 is a magnetic sensor, in this case a Hall effect sensor 33. The Hall effect sensor 33 produces a first measurement signal, in this case an analogue measurement signal the amplitude of which depends on whether there is a tooth or a recess opposite the Hall effect sensor 33. The first measurement signal has a frequency that is proportional to the rotation speed of the target 32 and therefore the rotation speed of the wheel 20.

The main aim of the first measuring device is to detect the locking of the wheel 20 or the start of locking. In this case, a braking computer of the braking system will modulate the braking command sent to the brake 21 (anti-skid function).

It will be noted that the first sensing component 33 could be redundant in order to improve the availability of the anti-skid function.

The aircraft wheel and brake assembly also includes a second measuring device arranged to measure a temperature prevailing inside the stack of carbon discs 31.

The second measuring device comprises a type K thermocouple probe 34 positioned in a cavity of the torque tube 30 of the brake 21.

The wheel and brake assembly also comprises a third measuring device arranged to measure wear of the carbon discs 31.

The third measuring device includes a second target and a second sensing component 35. The second target is a rod, metal here, that is connected to the stack of carbon discs 31. The second sensing component 35 is a magnetic induction sensor, in this case an LVDT (Linear Variable Differential Transformer) 35. The LVDT 35 measures the movement of the rod as the carbon discs 31 wear under the effect of friction during braking of the aircraft.

The wheel and brake assembly also includes a data concentrator 40. The data concentrator 40 comprises a housing 41 and at least one printed circuit board 42 incorporated into the housing 41.

The data concentrator 40 is mounted on the brake ring 24.

The data concentrator 40 is connected by electrical wires 46 to the Hall effect sensor 33 of the first measuring device, to the thermocouple probe 34 of the second measuring device, and to the LVDT 35 of the third measuring device. It will be noted that the electrical wires 46 that connect the data concentrator 40 to the thermocouple probe 34 are chromel and Alumel (registered trademark) wires.

The data concentrator 40 comprises a single electrical connector 43. The data concentrator 40 is connected to a cable 44 via the electrical connector 43. The cable 44 incorporates electrical wires in which a power supply travels that makes it possible to power the data concentrator 40 itself, together with the first, second and third measuring devices. The cable 44 also incorporates electrical wires in which a communication bus is implemented.

The use of a single connector 43 makes it possible to simplify the maintenance operations on the brake. When a brake must be replaced because its friction members are completely worn, it is not necessary to disconnect a connector for each measuring device, and this single connector must simply be disconnected.

The data concentrator 40 acquires measurement signals produced by the first measuring device, the second measuring device and the third measuring device.

The data concentrator 40 performs various processing operations on the measurement signals, and produces digital monitoring signals on the basis of the measurement signals.

These processing operations can comprise digitization of the measurement signals, in which case the printed circuit board 42 of the data concentrator 40 comprises one or more analogue-digital converters. This conversion is optional, as the measurement signals produced by the sensors could already be digital signals.

These processing operations can also comprise shaping prior to transmission.

These processing operations can also comprise an analysis of the measurement signals in order to carry out monitoring of the wheel and brake assembly within the data concentrator 40 itself. In this case, the digital monitoring signals can comprise warning messages.

It will therefore be understood that the processing operations carried out by the data concentrator 40 can be relatively simple (and consist, for example, of simply digitizing the measurement signals or, if the measurement signals are already digital, of simply transmitting said digital signals), or relatively complex.

The data concentrator 40 transmits the digital monitoring signals, via the digital bus of the cable 44 (and therefore via the connector 43), to the outside of the wheel and brake assembly, in this case to the avionics systems of the aircraft. The information is then available for the braking computer providing the anti-skid function and for maintenance personnel, and can also be displayed in the cockpit for the pilots, particularly the temperature and wear of the brakes.

It will be noted that it is entirely possible for the data concentrator 40 to transmit the digital monitoring signals to the outside of the data concentrator 40 via wireless communication.

In this case, the connector 43 is solely used to supply power to the data concentrator 40, or can be eliminated by means of the use of a battery in the data concentrator 40.

The data concentrator 40 then incorporates a wireless transmitter that transmits the digital monitoring signals to a receiver installed in the landing gear bay or in another location on the aircraft. The data concentrator 40 can also incorporate a wireless receiver so that the data concentrator 40 can receive data.

The wireless communication is for example radio communication, in which case the wireless transmitter and the wireless receiver comprise an antenna, or optical communication, in which case the wireless transmitter comprises a light source (for example a light-emitting diode) and the wireless receiver comprises a photoreceptor (for example a photodiode).

Advantageously, the temperature compensation of the measurement signals produced by the thermocouple probe 34 of the second measuring device is carried out in the data concentrator 40.

The junction between the copper wires and the chromel and Alumel (registered trademark) wires is thus made in the data concentrator 40. The cold junction temperature is measured in the data concentrator 40. The temperature is measured by a temperature sensor, for example an RTD (Resistance Temperature Detector) or a thermistor.

Here, "temperature compensation" is therefore given to mean the junction of the wires and the measurement of the cold junction temperature.

The "compensated" temperature of the stack of discs 31 can also be determined in the data concentrator 40. In this case, the data concentrator 40 comprises a processing component, mounted for example on the printed circuit board 42, that acquires the voltage measured at the terminals of the thermocouple probe 34, converts the cold junction temperature into a reference voltage, calculates a compensated measured voltage on the basis of the measured voltage and the reference voltage, and deduces the temperature of the stack of discs 31 therefrom. The processing component is for example a microcontroller.

This solution is highly advantageous, as the length of the chromel and Alumel (registered trademark) wires is very short between the thermocouple probe 34 and the data concentrator 40, which is positioned on the brake ring 24 of the brake 21. The length of wire on the brake 21 for the temperature measurement is therefore reduced, which makes it possible to improve the accuracy of the measurement and reduce the cost of the second measuring device.

The manner in which the data concentrator 40 is positioned on and fastened to the brake ring 24 will now be described.

The data concentrator 40 is positioned between two adjacent brake actuators 25. The connector 43 extends towards the outside of the brake ring 24 in a radial direction, so that it is easily accessible. It could also extend towards the outside of the brake 21 in a direction parallel to the axis of rotation of the wheel 20.

Several locations are possible for installing the data concentrator 40 on the brake ring 24.

Figure 4:
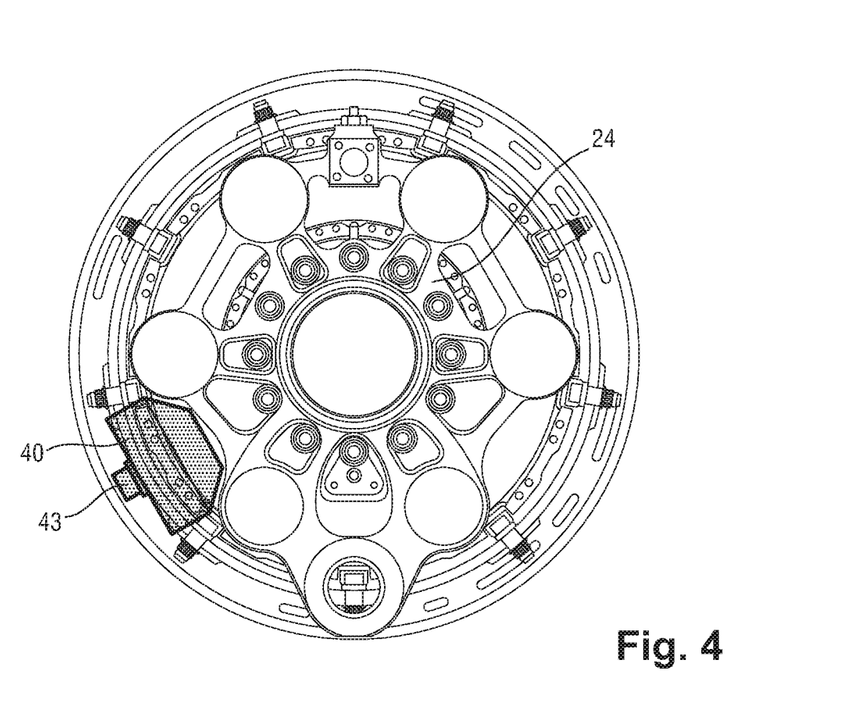
FIG. 4 shows the actuator bracket and the data concentrator in a first position.
Figure 5:
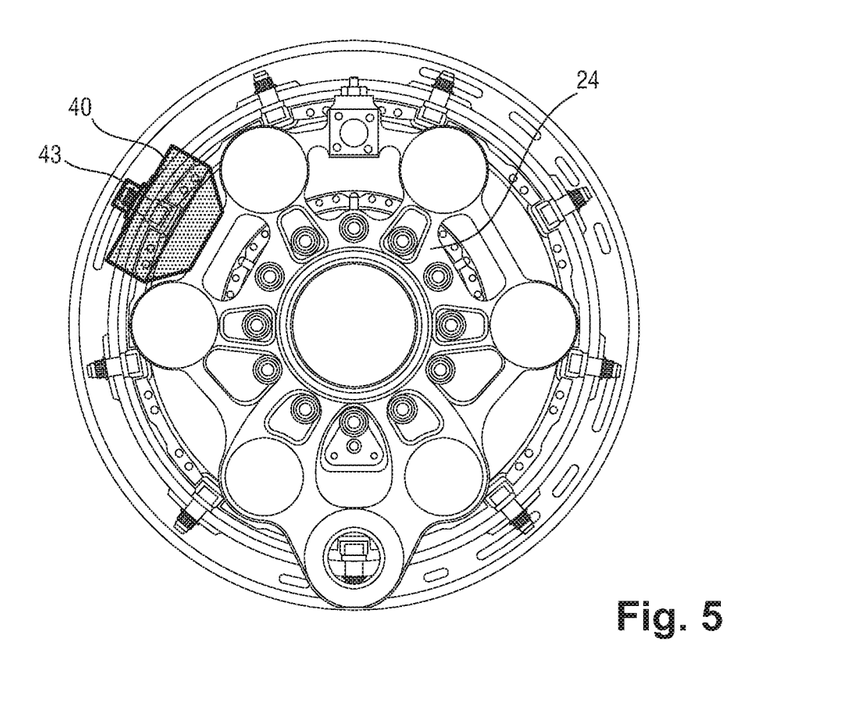
FIG. 5 shows the actuator bracket and the data concentrator in a second position.
Figure 6:
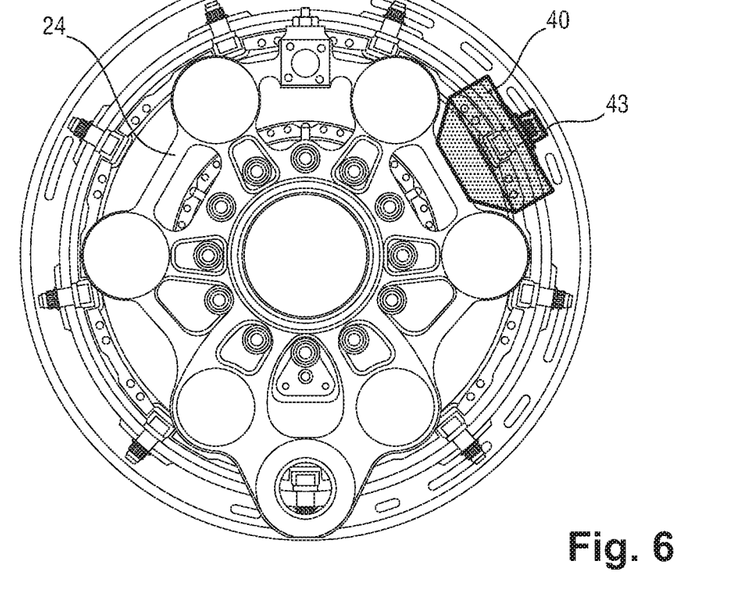
FIG. 6 shows the actuator bracket and the data concentrator in a third position.
Figure 7:
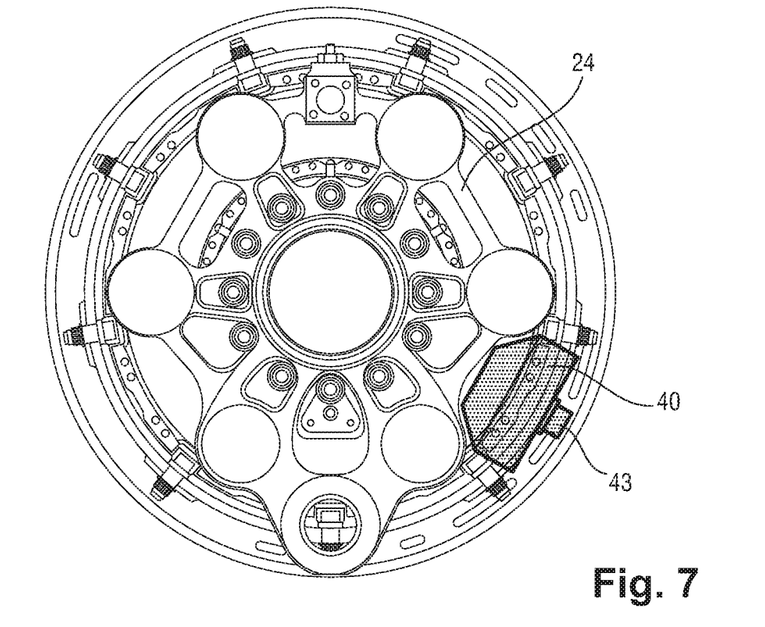
FIG. 7 shows the actuator bracket and the data concentrator in a fourth position.

In FIG. 4, the data concentrator 40 is situated in a left-hand lower zone of the brake ring 24. In FIG. 5, the data concentrator 40 is situated in a left-hand upper zone of the brake ring 24. In FIG. 6, the data concentrator 40 is situated in a right-hand upper zone of the brake ring 24. In FIG. 7, the data concentrator 40 is situated in a right-hand lower zone of the brake ring 24.

When defining the position of the data concentrator 40, the protection of the data concentrator 40 is sought in particular from the impact of small stones when the aircraft lands at high speed or during the take-off phase.

The best location for the data concentrator 40 can vary from one aircraft to another.

The location chosen can depend on the left-hand or right-hand position of the brake 21 on the landing gear (and therefore the left-hand or right-hand position of the wheel 20). The part of the brake 21 that is most exposed to small stones is the part situated towards the front, which is not the same depending on whether the brake 21 is installed on the left-hand side or the right-hand side. The brake 21 can be provided with two zones for fastening the data concentrator 40 (corresponding for example to FIGS. 4 and 7). The data concentrator 40 is then installed as shown in FIG. 4 if the brake is mounted on the left-hand side of the landing gear, or as shown in FIG. 7 if the brake is mounted on the right-hand side of the landing gear, so that it is not situated towards the front of the landing gear.

It is advantageous to position the data concentrator in a lower zone of the brake ring 24 (as shown in FIGS. 4 and 7) so that the internal components of the data concentrator 40 are less exposed to the heat emitted by the carbon discs 31 of the brake 21 after a high-energy stop.

Figure 8:
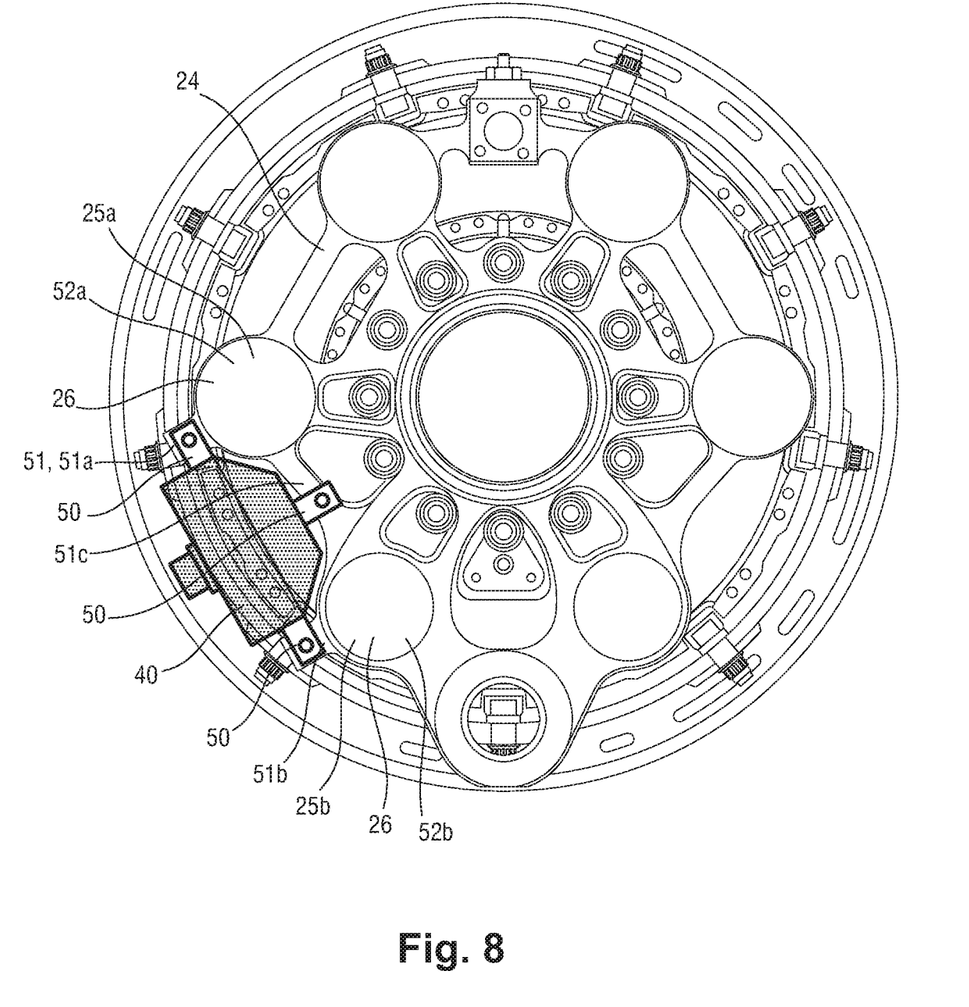
FIG. 8 shows the actuator bracket and the data concentrator in the first position, together with the means for fastening the data concentrator to the actuator bracket.

With reference to FIG. 8, the data concentrator 40 is fastened to the brake ring 24, between the brake actuator 25a and the brake actuator 25b, which are adjacent brake actuators 25, as follows.

The housing 41 of the data concentrator 40 includes a plurality of first fastening means 50, in this case three first fastening means 50, which are located at regular angular intervals around the centre of gravity of the data concentrator 40. This arrangement makes it possible for the data concentrator 40 and the fasteners to withstand without damage the vibration levels generated by the brake 21 during braking, and the impacts experienced on landing.

Here, each first fastening means 50 is a fastening tab.

The first fastening means 50 of the housing 40 engage with three second fastening means 51 of the brake ring 24. The three second fastening means 51 comprise a second fastening means 51a that extends from or on a rear portion 52a of the piston housing casing 26 of the brake actuator 25a, a second fastening means 51b that extends from or on a rear portion 52b of the piston housing casing 26 of the brake actuator 25b, and a second fastening means 51c positioned on the brake ring 24 between the two brake actuators 25a, 25b. "Rear portion of the piston housing casing" is given to mean the part that extends not on the side of the wheel 20 (onto which the cavity that forms the piston housing opens), but on the other side.

Here, each second fastening means 51 is a boss.

The first fastening means 50 are fastened to the second fastening means 51 by bolts.

The housing 41 is thus fastened to the brake ring 24 via three fastening points comprising two fastening points situated on the periphery of the brake ring 24, and one fastening point situated between the previous two fastening points but closer to the centre of the brake ring 24. This configuration enables particularly robust fastening.

In addition, as the data concentrator 40 does not extend or only very slightly extends beyond the thickness of the brake ring 24 since it is situated between the piston housing casings 26, its presence on the brake ring does not constitute a particular hindrance to maintenance operations.

Figure 9:
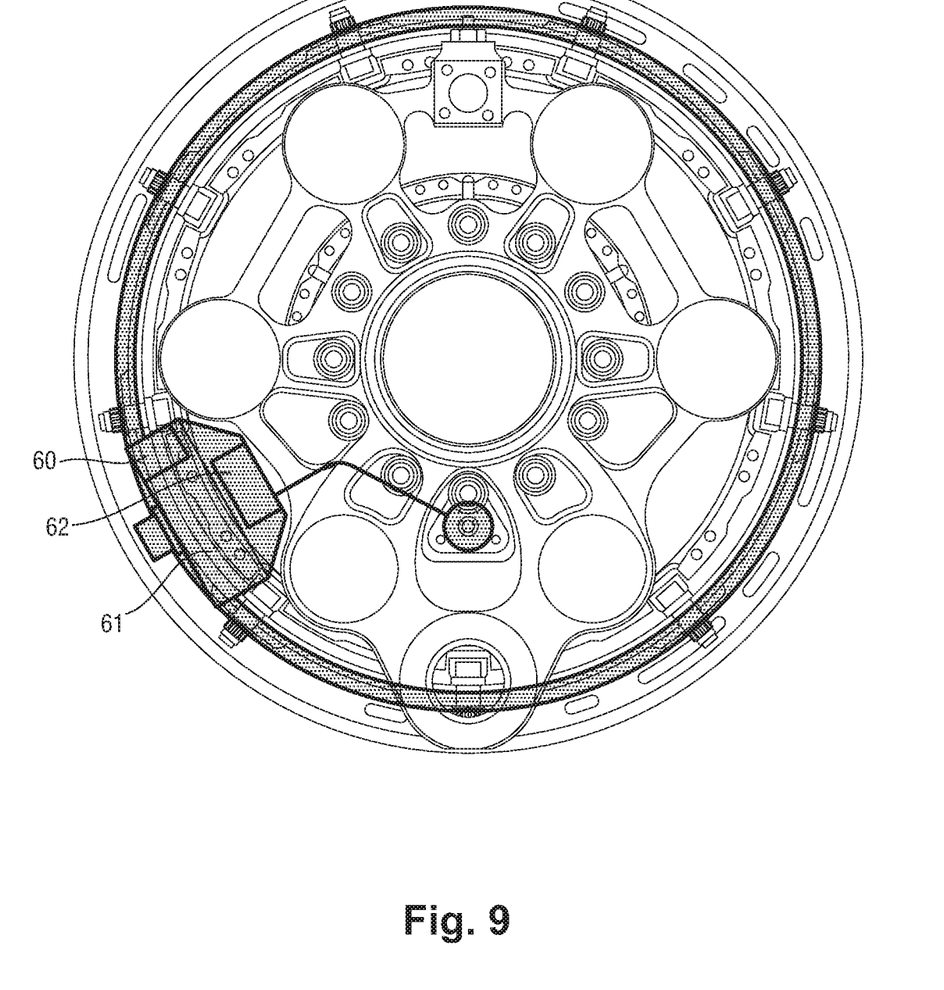
FIG. 9 shows a similar view to FIG. 3, for an aircraft wheel and brake assembly according to a second embodiment of the invention.

With reference to FIG. 9, in a wheel and brake assembly according to a second embodiment, the first sensing component 60 of the first measuring device, i.e. here, the Hall effect sensor 60 that produces a measurement signal representing the rotation speed of the wheel, is incorporated into or on the data concentrator 61. Similarly, the second sensing component 62 of the third measuring device, i.e. here the LVDT that produces a measurement signal representing the wear of the stack of discs, is incorporated into or on the data concentrator 61.

The data concentrator 61 becomes a one-piece member that includes the wheel speed sensor, the brake wear sensor and the brake temperature sensor packaging. This solution is more compact and reduces the number of electrical wires on the brake.

Figure 10:
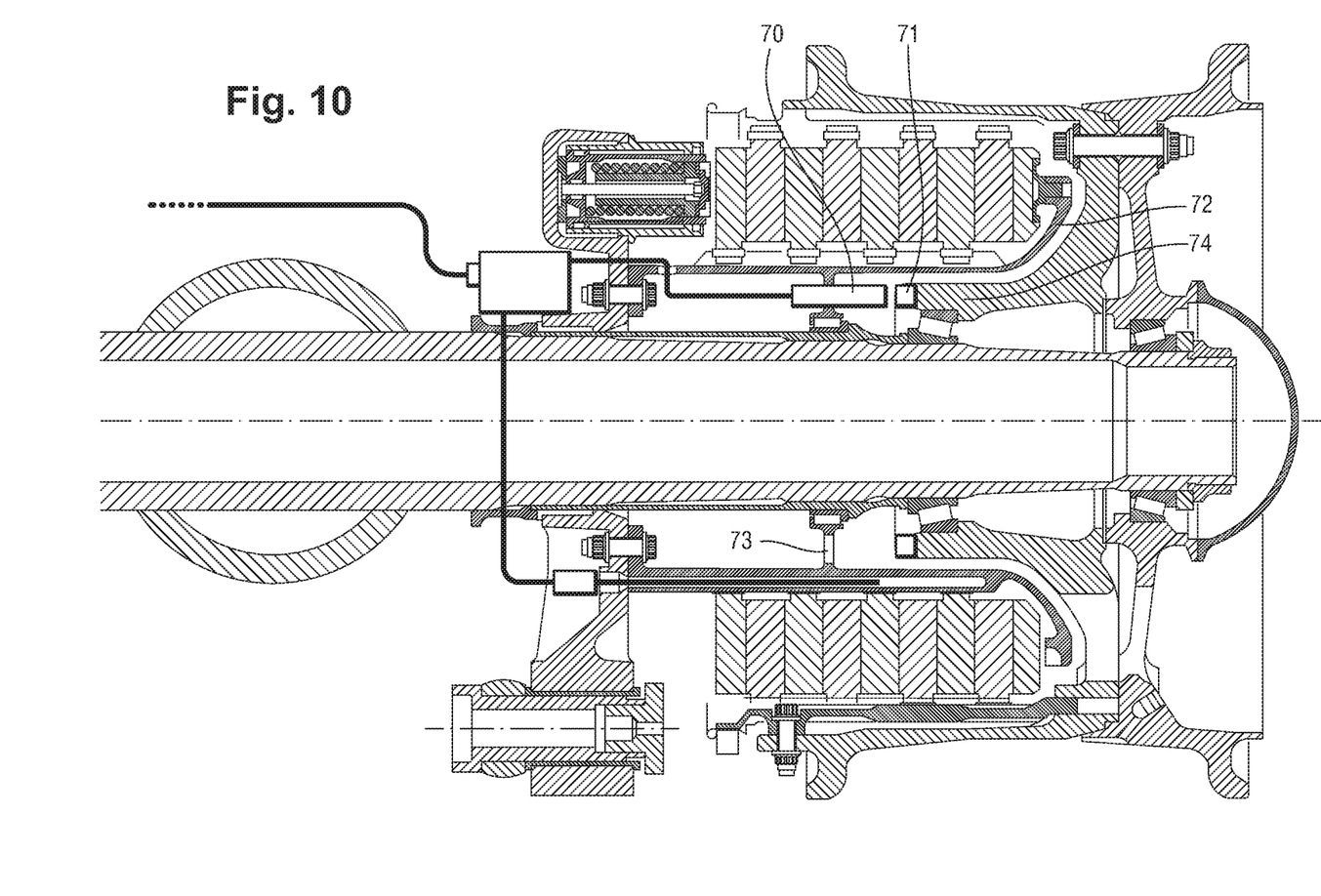
FIG. 10 shows a similar view to FIG. 2, for an aircraft wheel and brake assembly according to a third embodiment of the invention.

With reference to FIG. 10, in a wheel and brake assembly according to a third embodiment, the first sensing component 70 and the first target 71 of the first measuring device are installed in different locations.

The first sensing component 70, which again is a Hall effect sensor 70, is installed on the torque tube 72 of the brake and, more particularly, inside the torque tube 72, on a transverse annular web 73 of the torque tube 72.

The first target 71 is again a toothed wheel and is mounted on the hub 74 of the wheel. Alternatively, the hub 74 could be manufactured so that it has protrusions, for example alternating teeth and recesses, so that the hub 74 forms the first target 71.

The third embodiment makes it possible to improve the control of the clearance between the first sensing component 70 and the first target 71 and the relative positions of the first sensing component 70 and the first target 71. The mass of the first measuring device is reduced. However, the first measuring device is subjected to a higher temperature due to its proximity to the carbon discs of the brake.

Of course, the invention is not limited to the embodiments described but encompasses any variant that falls within the scope of the invention as defined by the claims.

In the first measuring device, the first sensing component and the first target can be different from those presented here.

The sensing component has been described here as a Hall effect sensor, and the target as a toothed wheel. This configuration does not under any circumstances limit the scope of the invention.

Regardless of the technology used, the sensing component can for example be a distance sensor or a detector.

The detector supplies an "on/off" measurement signal depending on whether or not the distance between the detector and the target is greater than a predetermined threshold.

The distance sensor supplies a measurement signal that depends on the distance between the sensor and the target, as is the case for a proximity sensor, for example.

The measurement technology can for example be induction technology, magnetic technology, ultrasound technology or optical technology. Ultrasound technology and optical technology make it possible to carry out the measurement on non-metallic materials, which makes it possible to use targets made from lighter composite materials.

Similarly, in the second measuring device and the third measuring device, the sensors, targets and technologies used can be different.

The housing of the data concentrator could be fastened to the brake ring differently.

Of course, the invention also applies to an electric brake: the actuator bracket is then an actuator holder that holds one or more electromechanical brake actuators.

The data concentrator could be connected to other measuring devices, for example to a device for measuring the pressure of the tyre on the wheel, a device for measuring the pressure prevailing in a shock absorber of the landing gear, etc.

The data concentrator could also be interrogated from the ground by an operator, by means for example of an antenna incorporated into the data concentrator.

The invention claimed is:

1. An aircraft wheel and brake assembly comprising:
a wheel;
a brake arranged to brake the wheel and comprising at least one friction member, an actuator bracket, and at least one brake actuator held by the actuator bracket and arranged to selectively exert a braking force on the at least one friction member;
a first measuring device arranged to measure a rotation speed of the wheel;
a second measuring device arranged to measure a temperature of the at least one friction member;
a third measuring device arranged to measure wear of the friction member;
a data concentrator arranged to acquire measurement signals produced by the first measuring device and by the second measuring device and not by the third measuring device, to process the measurement signals so as to produce digital monitoring signals, and to transmit the digital monitoring signals to the outside of the aircraft wheel and brake assembly,
the data concentrator comprising a housing and at least one printed circuit board incorporated into the housing, the data concentrator being mounted on the actuator bracket.

2. The aircraft wheel and brake assembly according to claim 1, in which the data concentrator is positioned between two adjacent brake actuators held by the actuator bracket.

3. The aircraft wheel and brake assembly according to claim 2, in which the brake is a hydraulic brake, and in which the housing is fastened to fastening means that extend on or from rear portions of two adjacent piston housing casings.

4. The aircraft wheel and brake assembly according to claim 1, in which the data concentrator is positioned in a lower zone of the actuator bracket.

5. The aircraft wheel and brake assembly according to claim 1, in which the first measuring device includes a first target and a first sensing component, the first target having a generally circular shape, being rigidly connected to a rim of the wheel for rotation therewith, and being positioned close to a peripheral portion of the rim of the wheel, the first sensing component being held by the actuator bracket.

6. The aircraft wheel and brake assembly according to claim 5, in which the first sensing component is incorporated into or on the data concentrator.

7. The aircraft wheel and brake assembly according to claim 1, in which the first measuring device includes a first target and a first sensing component, the first target having a generally circular shape and being mounted on a hub of the wheel, the first sensing component being mounted on a torque tube of the brake.

8. The aircraft wheel and brake assembly according to claim 7, in which the first sensing component is mounted on a transverse annular web of the torque tube.

9. The aircraft wheel and brake assembly according to claim 7, in which the hub includes protrusions and itself forms the first target.

10. The aircraft wheel and brake assembly according to claim 1, in which the second measuring device comprises a thermocouple probe, and in which temperature compensation is carried out in the data concentrator.

11. The aircraft wheel and brake assembly according to claim 1, in which the data concentrator comprises an antenna for transmitting the digital monitoring signals via wireless transmission.

12. An aircraft landing gear comprising the aircraft wheel and brake assembly according to claim 1.

13. An aircraft wheel and brake assembly, comprising:
a wheel;
a brake arranged to brake the wheel and comprising at least one friction member, an actuator bracket, and at least one brake actuator held by the actuator bracket and arranged to selectively exert a braking force on the friction member;
a first measuring device arranged to measure a rotation speed of the wheel;
a second measuring device arranged to measure a temperature of the friction member;
a third measuring device arranged to measure wear of the friction member;
a data concentrator arranged to acquire measurement signals produced by the first measuring device and by the second measuring device and not by the third measuring device, to process the measurement signals so as to produce digital monitoring signals, and to transmit the digital monitoring signals to the outside of the aircraft wheel and brake assembly,
the data concentrator comprising a housing and at least one printed circuit board incorporated into the housing, the data concentrator being mounted on the actuator bracket, and
the brake assembly being devoid of a measuring device arranged to measure wear of the friction member.

* * * * *